UNITED STATES PATENT OFFICE 2,538,955

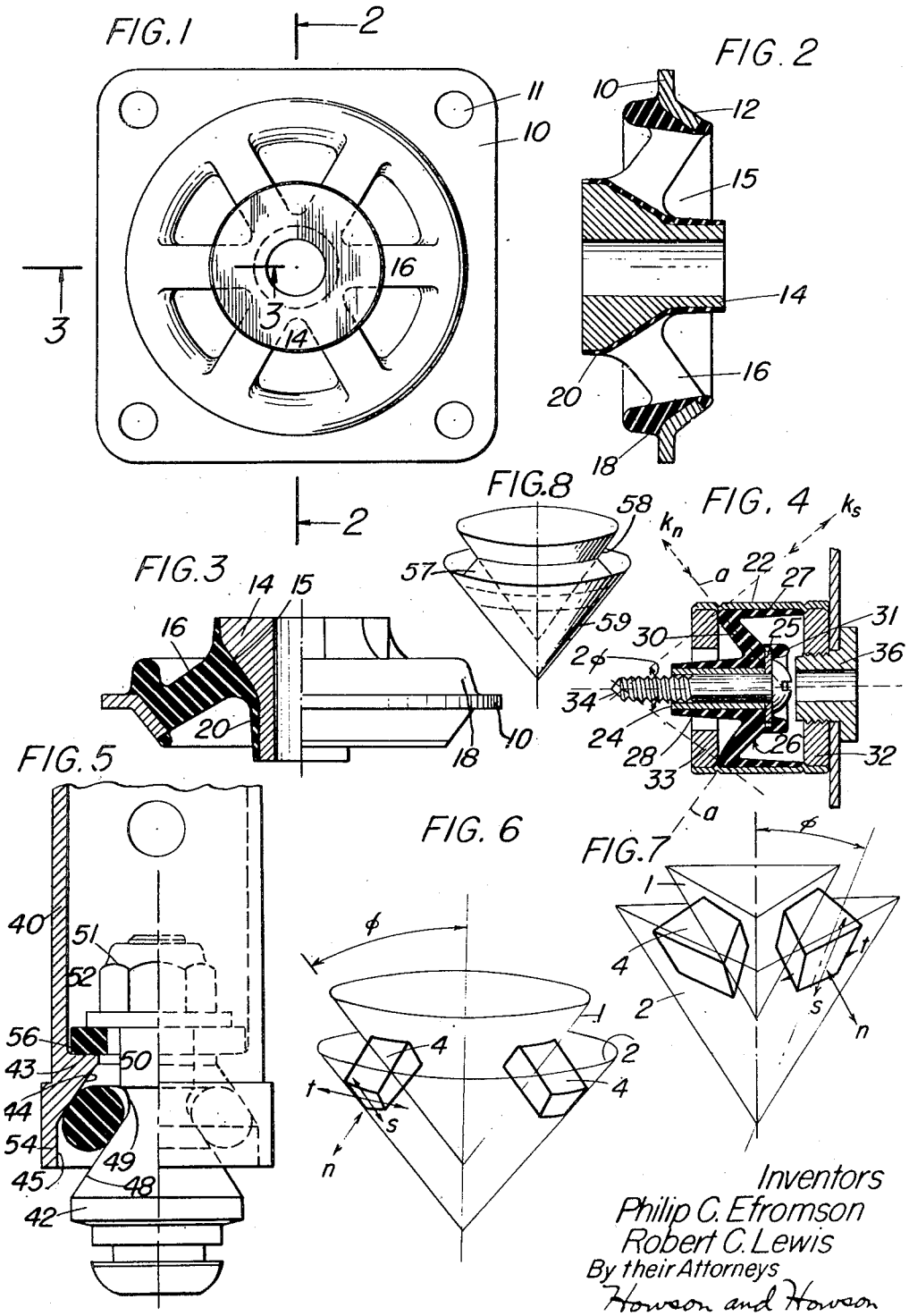

NONDIRECTIONAL ISOLATOR UNIT

Philip C. Efromson and Robert C. Lewis, New Haven, Conn., assignors to The M. B. Manufacturing Company, Inc., New Haven, Conn., a corporation of Connecticut Application May 1, 1946, Serial No. 666,476

14 Claims. (Cl. 248—10)

The invention relates to isolator units for mounting objects to prevent the transmission of vibration between the object and its support and it is an object of this invention to provide an isolator unit having the same spring stiffness along each of three mutually perpendicular axes and of such construction that such characteristic results therefrom. It is also an object of this invention to provide an isolator unit of a construction which is suitable for manufacture in various sizes and for different loads and which has such characteristics as to require a minimum of calculation to provide a mount of non-directional characteristics in any size required.

In the drawings:

Fig. 1 is a plan view of an isolator unit in accordance with this invention;

Fig. 2 is a transverse sectional view taken as on line 2—2 of Fig. 1;

Fig. 3 is a view partly in elevation and partly in section taken as on line 3—3 of Fig. 1;

Fig. 4 is a central transverse sectional view of an isolator unit of modified construction;

Fig. 5 is a view partly in elevation and partly in vertical transverse section of another modification of an isolator unit in accordance with this invention;

Figs. 6 and 7 are diagrammatic views of isolator units illustrating the principle on which this invention depends; and Fig. 8 is a view similar to Fig. 6 of a modified form of isolator unit.

In designing vibration isolation suspensions which are to use commercially available isolator units, much complex calculation is required to make a thorough analysis. In many cases this is complicated by the need for considering the orientation of the unit due to its different stiffnesses in various directions. Much of this calculation has been eliminated by the use of nondirectional units, that is, units having the same spring rate in each of three mutually perpendicular directions, but even in these cases considerable calculation is required in order to assure the design of a family of units of varying stiffness and load capacity, each having the desired nondirectional properties. We have discovered that for isolator units of a particular class or design the calculations can be further simplified and nondirectional units assured regardless of the hardness, size or continuity of the rubber element of the unit. Referring to Figs. 6 and 7 there are shown a plurality of rubber elements 4 of simple shape, equally spaced circumferentially and each having its longitudinal axis $n$ inclined so that with each element having stiffnesses $k_s$, $k_t$ and $k_n$, that is, the stiffnesses in three mutually perpendicular directions as shown by the arrows $s$, $t$ and $n$, the direction of the stiffness $k_s$ is parallel to a ray of a conical surface or on the surface of a right pyramid. If $k_s$ be considered the stiffness of a rubber element of extreme thinness placed as the element 4 of Fig. 6, the surface formed by the arrows $s$ of an infinite number of such elements is a conical surface as the conical surface 2, this being the limiting case of a right pyramid, as shown in Fig. 7, formed with an infinite number of sides. Thus the right pyramid of Fig. 7 is the generic form of the cone of Fig. 6. With the direction of the stiffness $k_s$ parallel to the ray of a conical surface, the direction of stiffness $k_t$ is tangent to the conical surface and the direction of the stiffness $k_n$ is normal to the conical surface. Similarly at the opposite end of the element 4 the arrows $s$ indicating the direction of the elemental stiffnesses $k_s$ would also form a similar conical surface, as 1, and the stiffnesses $k_n$ and $k_t$ would be similarly related. In the case of the arrangement illustrated in Figs. 6 and 7 it has been found by equating the axial and radial stiffnesses of such a unit in terms of the elemental stiffnesses $k_s$, $k_t$ and $k_n$ that the angle $\phi$ required to obtain equality of the unit stiffnesses can be found from the equation $$\sin^2 \phi = 1 - \frac{2k_n - k_s - k_t}{3(k_n - k_s)}$$

and furthermore it has been found that if there are three or more rubber elements 4 and these rubber elements have equal stiffness in the $t$ and $s$ directions indicated in the figure and the cone angle $2\phi$ equals approximately 70.8 degrees then the stiffness of the resilient unit will be equal in all directions regardless of the ratio of the elemental stiffnesses in the $t$ and $n$ directions. The mathematical reason for this becomes apparent by setting $k_t$ equal to $k_s$ in the equation given above, in which case we have:

$$\sin^2 \phi = 1 - \frac{2(k_n - k_s)}{3(k_n - k_s)} = 1 - \frac{2}{3}$$

or $$\sin^2 \phi = \frac{1}{3}$$

The solution for this equation is approximately $\phi = 35.4°$, which provides a unique condition in which there is equality of the resilient unit stiffnesses without regard to the values of $k_n$ or $k_s$. In practice, however, it is found $2\phi$ may vary slightly as 70.8°±2° or from 69° to 73° without materially affecting the insolator unit. We have illustrated in the foregoing that when the angle φ, which is half the apex angle, of Fig. 6 is set at 34.5° to 36.5°, a non-directional unit results. It is also apparent in reference to Fig. 6 that if we refer to the direction of the resilient material which is marked "n" in that figure, this line makes an angle with the common axis of the load-carrying members 53.5° to 55.5° when φ is set at 34.5° to 36.5°. Reference is made in some claims to the angle of the load-carrying surfaces which forms the half apex angle of 34.5° to 36.5°. At other times we refer to the angle formed by the resilient material, in which case the angle becomes 53.5° to 55.5°. The apex angle is also referred to as the cone angle. In the discussions that follow, the "magic angle" referred to is 34.5° to 36.5° when we are referring to the load-carrying surfaces, and when its counterpart for the angle of the resilient material is used, it is 53.5° to 55.5°. It will be seen that the basic angle is unchanged whether we refer to the 34.5° to 36.5° of the load-carrying surfaces or 53.5° to 55.5° when we refer to the resilient material angle.

It is well known that a rubber block between end plates is relatively stiff in compression and relatively soft in shear and that the stiffness in each of two perpendicular shear directions is the same provided there is no slipping or rolling of the resilient element, such being the case, for instance, if the elements are bonded to the supporting surfaces. It has also been found that, retaining the cone angle of approximately 70.8° it is possible to increase the number of the rubber elements 4 until there remains no space between the elements thus forming the rubber element as a continuous ring while retaining the nondirectional properties of the unit. It should be noted that an isolator unit can be designed in this simple way by using the cone angle indicated only when the resilient means are simple in shape, i. e., so that $k_s = k_t$, rather than a complex shape. All the resilient means shown in the drawings are simple in shape in that they have a longitudinal axis of essential symmetry which contains the stiffness vector $k_n$. A unit having such resilient means in the form of a continuous element 57 bonded to the supporting surfaces 58, 59 is shown diagrammatically in Fig. 8.

Although under the above stated conditions the directional properties of the unit are not dependent on the shape, hardness, size or continuity of the rubber elements, the actual value of the unit stiffness can be found from the expression $$K = \frac{k_n}{3} + \frac{2k_s}{3}$$

where K, the stiffness of the resilient unit (which is the same in all directions) is equal to one-third the summation of the stiffness of the rubber elements of the unit in a direction normal to the cone surface plus two-thirds the summation of the stiffness of the rubber elements of the unit in a direction parallel to an element of the cone surface. This relation holds true for any resilient or rubber-like material.

It has also been discovered that variation in the angle of the cone, relative to whose surfaces the element stiffnesses $k_n$, $k_s$, and $k_t$ are normal, parallel and tangent respectively, is a convenient and positive way of varying the ratio of axial stiffness to radial stiffness of the resilient unit.

A larger angle increases the stiffness of the resilient unit axially relative to its lateral stiffness, and a smaller angle decreases the axial stiffness relative to the lateral stiffness.

It is understood that three or more equally spaced elements can be replaced functionally by three or more equally spaced identical groups of elements, no restriction being placed on the spacing within the groups.

In practice, the desired inclination of the rubber elements may be attained by supporting the rubber element or elements upon an inclined surface forming the desired cone angle with its axis. Thus as shown in Figs. 1, 2 and 3 a resilient unit embodying this invention may comprise a metal outer plate member 10 having openings 11 by which it is secured to a supported or supporting member (not shown) and a central circular opening surrounded by a continuous flange 12 inclined to the axis of the opening at an angle of approximately 35.4°. It also comprises a tubular central member 14 having a tapered or conical portion adjacent one end thereof, the surface of which is inclined to the longitudinal axis of the member so as to form a cone angle of 70.8° and thus be parallel to the surface of the flange 12 of the plate member 10. Extending between the parallel surfaces of the members 10 and 14 are a plurality of rubber elements 16 of substantially rectangular cross-section and preferably bonded to the faces of the members 10 and 14. For convenience in attaching the rubber elements 16 to the members 10 and 14 the elements 16 may be formed integral with an outer ring portion 18 shaped to fit the flange 12 of the member 10 and a tubular central portion 20 shaped to fit the central tubular member 14. A bolt extending through the central tubular member 14 secures the unit to the supported or supporting member. The arrangement of this construction is identical with the construction indicated diagrammatically in Figs. 6 and 7 and the directions of the stiffnesses of the rubber elements of Figs. 1, 2 and 3 would be as in Figs. 6 and 7.

While the conical surfaces of Figs. 1, 2 and 3 form a convenient means for positioning the rubber element or elements in accordance with this invention, such surfaces can be omitted and a unit in accordance with this invention but of modified construction may comprise, as shown in Fig. 4, a cylindrical outer member 22, a tubular inner member 24 having a flange 25 at one end and a rubber element 26 having tubular portions 27 and 28 bonded to the members 22 and 24, respectively, and an annular portion or three or more uniformly spaced resilient elements 30 formed integral with the tubular portions 27 and 28 and so secured thereto that the longitudinal axes a of elemental sections of the annular rubber portion or resilient elements 30 form a cone angle of substantially 109.2°. These longitudinal axes are radially straight lines along the average direction of the resilient means between the two load-carrying surfaces. The annular portion 30 may be formed with a portion 31 integral therewith which overlaps the flange 25 of the tubular inner member 24 to aid in securing the tubular element 24 in position in the rubber element 26 and to serve as a bumper. End members 32 and 33 suitably secured in the outer member 22 serve to protect the rubber element while a bolt 34 inserted in the inner member 24 and a bushing 36 secured in the threaded opening in the end member 32 serve to secure the unit to the supported and supporting members. By making the flange 25 of greater diameter than the openings left in the end members 32 and 33 separation of the parts of the unit upon failure of the rubber element is prevented. By making the tubular portion 28 of sufficient length to project through the opening, providing the portion 31 and forming the tubular portion 27 as a lining to the outer member 22 contact of metal to metal is prevented and rubber is provided to serve as a bumper for all excess movements of the rubber element thus permitting of the shipment of delicate instruments mounted upon the units without the necessity of providing means for preventing movement of the instruments during handling in transit. The construction just described retains the essential characteristic of having three mutually perpendicular stiffness vectors, the vectors $k_s$, perdendicular to the axes $a$, form the rays of a cone having a cone angle $2\phi$ of 70.8°, the stiffness $k_t$ being tangent to the surface of that cone, the stiffness $k_n$ being along the axes $a$, and the stiffness $k_t$ being perpendicular to and equal to the stiffness $k_s$. It will be noted that in all the forms thus far described the resilient means not only has a cross-section having a longitudinal axis of essential symmetry but also is contained in—and in the forms having continuous elements actually is—a body of revolution defined by such cross-section when rotated with its axis of symmetry perpendicular to a conical ray at an angle of about 35° to the axis of the cone described by the revolution.

The modification of the invention shown in Fig. 5 comprises a tubular metal sleeve member 40 and an inner spindle member 42. The outer member 40 is provided with an annular inner shoulder 43, a conical surface 44 merging at one edge into a cylindrical inner surface 45 of the sleeve 40. The inner spindle member 42 comprises a conical surface 48 corresponding to the surface 44 of the sleeve member 40 and which merges into the outwardly curved surface portion 49. It also comprises a shank portion 50 threaded at one end to receive a nut 51 which holds a washer 52 in place on the shank. The spindle, at its other end, is formed to provide suitable attaching means for engaging in a recess in a quick disconnect fitting (not shown) secured to a suitable support. Between the members 40 and 42 is a rubber ring 54, shown as of circular cross-section when in a free condition, which is engaged between the conical surfaces 44 and 48 and a rubber ring 56 of rectangular cross-section engaged between the shoulder 43 on the sleeve member and the washer 52 on the spindle. Preferably the rubber element 54 is not bonded to the metal thus permitting of ready replacement of the rubber element in case of damage due to overloading but it is to be understood the rubber element may be bonded to the metal.

This construction provides a complete interlocking of metallic parts preventing separation thereof in the event of failure of the rubber element and the rubber element 54 and rubber ring 56 prevent metal to metal contact of the relatively moving parts under overload conditions in any direction.

On assembly it is possible to pre-load the rubber element 54 so that its initial circular cross-section becomes oblate as shown. When the load carried by the unit exceeds the amount of the pre-load on the rubber element 54 the rubber element is further compressed and a relatively low spring rate is obtained. On increased loading, the rubber element, whose volume remains substantially unchanged under load changes shape sufficiently to bear on the curved surface 49 of the member 42 and the cylindrical surface 45 of the sleeve member 40. Under these conditions a higher load is required to produce succeeding increments of deflection and a relatively sharp break in the load deflection curve of the unit is obtained with relatively different linear characteristics for each of the load regimes.

In the construction of Fig. 5 with the rubber element not bonded to the conical surfaces there is not present a condition necessary for attainment of a nondirectional characteristic in the unit since the stiffness in the $s$ direction ($k_s$) of a small element of the ring 54 differs, due to rolling action, from the stiffness in the $t$ direction ($k_t$) of the same element. However, upon determining the stiffnesses in the $n$, $t$ and $s$ directions ($k_n$, $k_t$ and $k_s$) the cone half angle $\phi$ required for nondirectional properties of the unit can be found from the expression $$\sin^2 \phi = 1 - \frac{2k_n - k_s - k_t}{3(k_n - k_s)}$$

given above.

Reference is made to the companion application of Philip C. Efromson, John A. Dickie and Robert C. Lewis, Ser. No. 634,461, filed December 12, 1945, now Patent No. 2,538,954, dated January 23, 1951, containing claims generic to the structures shown herein. Reference is also made to the copending application of Robert C. Lewis and Karl Unholtz Ser. No. 730,080, filed February 21, 1947, which discloses and claims a suspension in which the isolators here disclosed and claimed may be used.

What is claimed is:

1. A vibration isolator unit comprising two members providing cooperating spaced load-carrying surfaces having a common axis, in combination with resilient means spacing those surfaces, radially straight lines along the average direction of the resilient means between the two load-carrying surfaces taken at three or more points equally spaced around the axis of the unit, each forming with said common axis an angle of 53.5° to 55.5°, the stiffness of the resilient means in the two directions at right angles to any such radical line and to each other being equal; whereby the unit has non-directional characteristics.

2. A vibration isolator unit comprising two members providing cooperating spaced load-carrying surfaces having a common axis, and resilient means of simple shape spacing said surfaces, said resilient means having a cross-section with a longitudinal axis of essential symmetry connecting load-carrying surfaces of the two members, the resilient means being located with the said axis of its cross-section perpendicular to a conical ray which is at an angle of 34.5° to 36.5° to the common axis of the members, the axis of the cone being coincident with the axis of the load-carrying members; whereby the unit has non-directional characteristics and is linear throughout the normal working range.

3. A vibration isolator unit according to claim 2 in which the resilient means are bonded to the load-carrying surfaces.

4. A vibration isolator unit in which there are two spaced annular members having load-carrying surfaces, said surfaces having a common axis, in combination with resilient means between the surfaces having an axis of essential symmetry connecting the load-carrying surfaces of the two members and lying at such an angle that the direction of principal compressional stiffness of the resilient means is normal to the surface of a cone whose axis coincides with the common axis of the load-carrying surfaces, said cone having an apex angle of 69° to 73°, and there being equality of stiffness of the rubber in the two directions perpendicular to each other and to the said direction of principal compressional stiffness; whereby the unit has non-directional characteristics.

5. A vibration isolator unit according to claim 1 in which the resilient means is a single continuous resilient element.

6. A vibration isolator unit according to claim 1 in which the resilient means comprises a series of three or more discontinuous elements spaced equally around the circle, the several elements having sections taken radially of the unit which are uniform.

7. A vibration isolator unit according to claim 6 in which the spaced load-carrying surfaces lie in the surfaces of cones whose apex angles are between 69° and 73°.

8. A vibration isolator unit comprising two members having spaced, opposed, load-carrying surfaces lying in the surfaces of cones having coincident axes, in combination with resilient means spacing said surfaces, the cone angles formed between either surface and the axes being between 34.5° and 36.5°, the stiffness of the resilient means parallel to the surface of either cone and tangent thereto being equal; whereby the unit has non-directional characteristics.

9. A vibration isolator unit comprising two rigid members having annular load-carrying surfaces with coincident axes, which surfaces are opposed to each other, in combination with resilient means of simple shape spacing the surfaces, the average direction of the resilient means being at right angles to the two load-carrying surfaces, each load-carrying surface forming part of the surface of a cone having an apex angle of from 69° to 73°, and considered at three or more points equally spaced about the axis, there being equality of stiffness of the resilient means in the two directions at right angles to each other and to the said average direction of the resilient means; whereby the unit has non-directional characteristics and the unit is linear through the normal working range.

10. A vibration isolator unit according to claim 9 in which the resilient means is a single continuous resilient element.

11. A vibration isolator unit according to claim 10 in which the resilient means is not bonded to the load-carrying surfaces.

12. A vibration isolator unit in which there are two rigid members having opposed load-carrying surfaces each of which is a portion of a right pyramid, said surfaces having coincident axes, each surface forming an angle of from 34.5° to 36.5° with the axes, in combination with resilient means of simple shape between said surfaces and functionally perpendicular to the surfaces of the two pyramids, said resilient means having equal stiffnesses in two directions which are not only at right angles to each other but also at right angles to the perpendicular to the surfaces; whereby the unit has equality of spring rates in every direction and is linear through the normal working range.

13. In a non-directional isolator unit according to claim 1, the provision on the members having the load-carrying surfaces of parts which overlap in a direction normal to the load-carrying surfaces, whereby the members cooperate to prevent separation of said members upon failure of the resilient means.

14. An isolator unit construction according to claim 13 in which the normal load-carrying surfaces of the two members are conical and opposed and the resilient means is of simple shape, said load-carrying surfaces providing for a predetermined deformation of said resilient means and one range of deflection and stiffness for said resilient means, said members beyond said surfaces converging towards each other on both sides of the resilient means, thereby providing a second range of deflection of said resilient means, giving increased stiffness.

PHILIP C. EFROMSON.
ROBERT C. LEWIS.

REFERENCES CITED

The following references are of record in the file of this patent:

UNITED STATES PATENTS

| Number | Name | Date |
|---|---|---|
| 2,023,756 | Brownyer | Dec. 10, 1935 |
| 2,179,959 | Schroedter | Nov. 14, 1939 |
| 2,245,295 | Piron | June 10, 1941 |
| 2,261,955 | Browne | Nov. 11, 1941 |
| 2,262,443 | Anderson | Nov. 11, 1941 |
| 2,310,832 | Taylor | Feb. 9, 1943 |